(12) United States Patent
Carr et al.

(10) Patent No.: US 7,468,884 B2
(45) Date of Patent: Dec. 23, 2008

(54) RISER RETENTION SYSTEM

(75) Inventors: Daniel S. Carr, Round Rock, TX (US); James Don Curlee, Round Rock, TX (US); Bradley Andrew Jackson, Pflugerville, TX (US); Kristine M. Little, Austin, TX (US); William John Morris, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 11/552,876

(22) Filed: Oct. 25, 2006

(65) Prior Publication Data
US 2008/0101011 A1 May 1, 2008

(51) Int. Cl.
*G06F 1/16* (2006.01)
(52) U.S. Cl. .................. 361/686; 439/326; 405/163; 348/571
(58) Field of Classification Search .......... 439/77, 439/160, 326; 348/552, 14.01, 571; 166/345, 166/352, 339; 405/163, 169; 361/752, 788, 361/679–687, 724–727
See application file for complete search history.

(56) References Cited

U.S. PATENT DOCUMENTS

| 5,338,214 | A | | 8/1994 | Steffes et al. |
| 5,926,378 | A | * | 7/1999 | DeWitt et al. ............... 361/788 |
| 6,046,912 | A | | 4/2000 | Leman |
| 6,147,871 | A | * | 11/2000 | DeWitt et al. ............... 361/752 |
| 6,466,448 | B1 | | 10/2002 | Baik |

* cited by examiner

*Primary Examiner*—Hung V Duong
(74) *Attorney, Agent, or Firm*—Haynes and Boone, LLP

(57) ABSTRACT

A riser retention apparatus includes a board. A component connector is mounted to the board. A support frame is coupled to the board adjacent the component connector and extends from the board. A riser guide is located on the support frame and operable to engage a riser and guide a riser connector on the riser toward the component connector. A riser retention member is operable to couple to the support frame to provide a retaining force to a riser in order to retain the riser connector in engagement with the component connector. A riser including a plurality of components coupled to it may be coupled to the component connector and the support frame and riser retention member may be used to support the riser and retain the riser in the component connector.

20 Claims, 15 Drawing Sheets

RISER RETENTION SYSTEM

BACKGROUND

The present disclosure relates generally to information handling systems, and more particularly to a riser retention system for an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs typically include connectors for coupling components such as, for example, memory modules, expansion cards, and variety of other components known in the art, to the IHS in order to increase the functionality of the IHS. However, sometimes it is desirable to increase the number of components that may connect to the IHS beyond the number of connectors that are included on the IHS. This increasing the number of components that may connect to the IHS raises a number of issues.

Conventionally, a riser may be used to increase the number of components that may connect to the IHS. For example, a memory riser may include a plurality of secondary memory connectors and a plug that is operable to couple to a primary memory connector on the IHS. By coupling the plug to the primary memory connector, the number of memory components that couple to the IHS may be increased from one memory component that may have been coupled to the primary memory connector to a plurality of memory components that may now couple to the second memory connectors. However, when such conventional risers are used to expand, for example, the number of Dual Inline Memory Modules (DIMMs) that may connect to an IHS from 8 DIMMs to 16 DIMMs, the size and weight of the riser and memory module combination creates an unstable system that may fail due to, for example, shock and/or vibration events. Furthermore, the additional DIMMs create more heat that must be dissipated and the blind mating of the risers to the memory connectors, which simplifies the manufacturing process, becomes a challenge.

Accordingly, it would be desirable to provide a riser retention system absent the disadvantages discussed above.

SUMMARY

According to one embodiment, a riser retention apparatus includes a board, a component connector mounted to the board, a support frame coupled to the board adjacent the component connector and extending from the board, a riser guide located on the support frame and operable as a means to engage a riser and guide a riser connector on the riser toward the component connector, and a riser retention member operable to couple to the support frame to provide a retaining force to the riser in order to retain the riser connector on the riser in engagement with the component connector.

BRIEF DESCRIPTION OF THE DRAWINGS

FIG. 3b is a bottom perspective view illustrating an embodiment of the riser retention member of FIG. 3a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
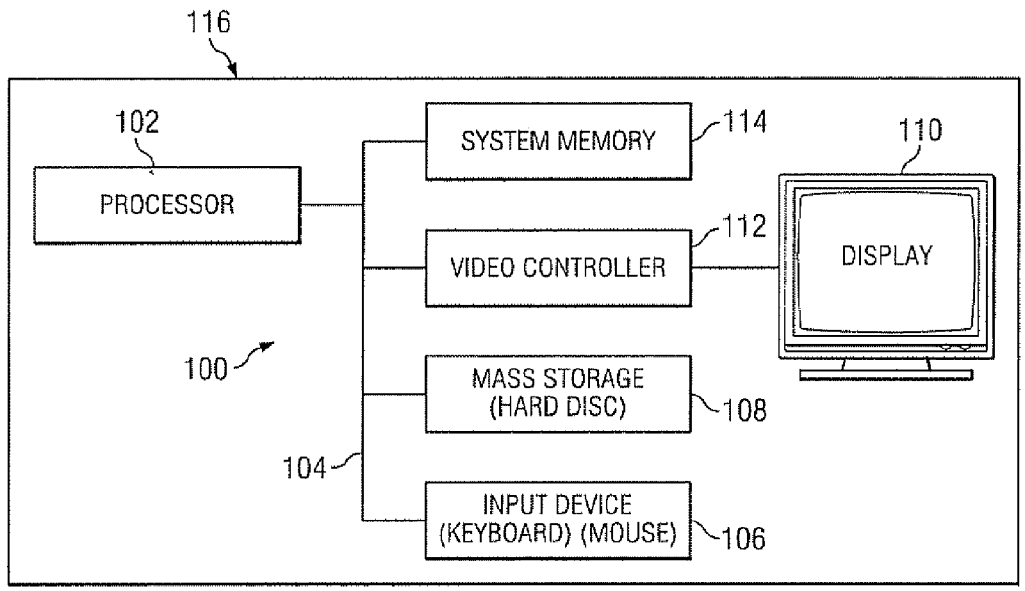
FIG. 1 is a schematic view illustrating an embodiment of an IHS.
Figure 7A:
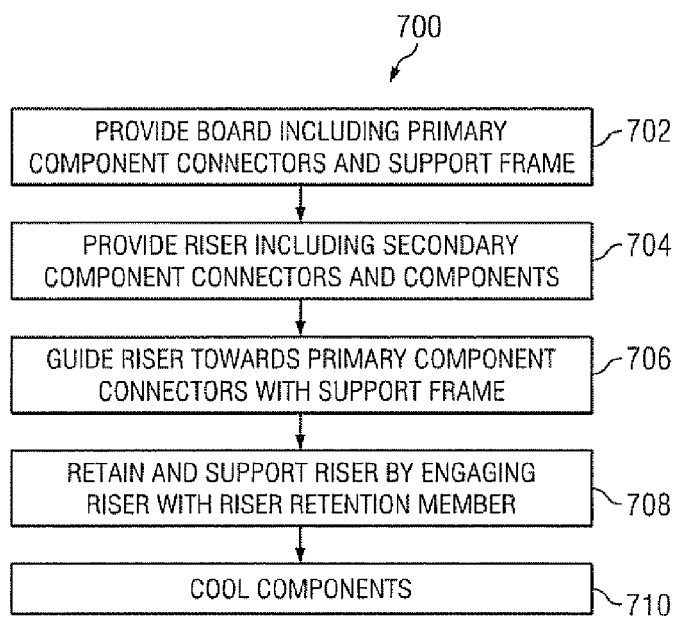
FIG. 7a is a flow chart illustrating an embodiment of a method for retaining a riser in an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
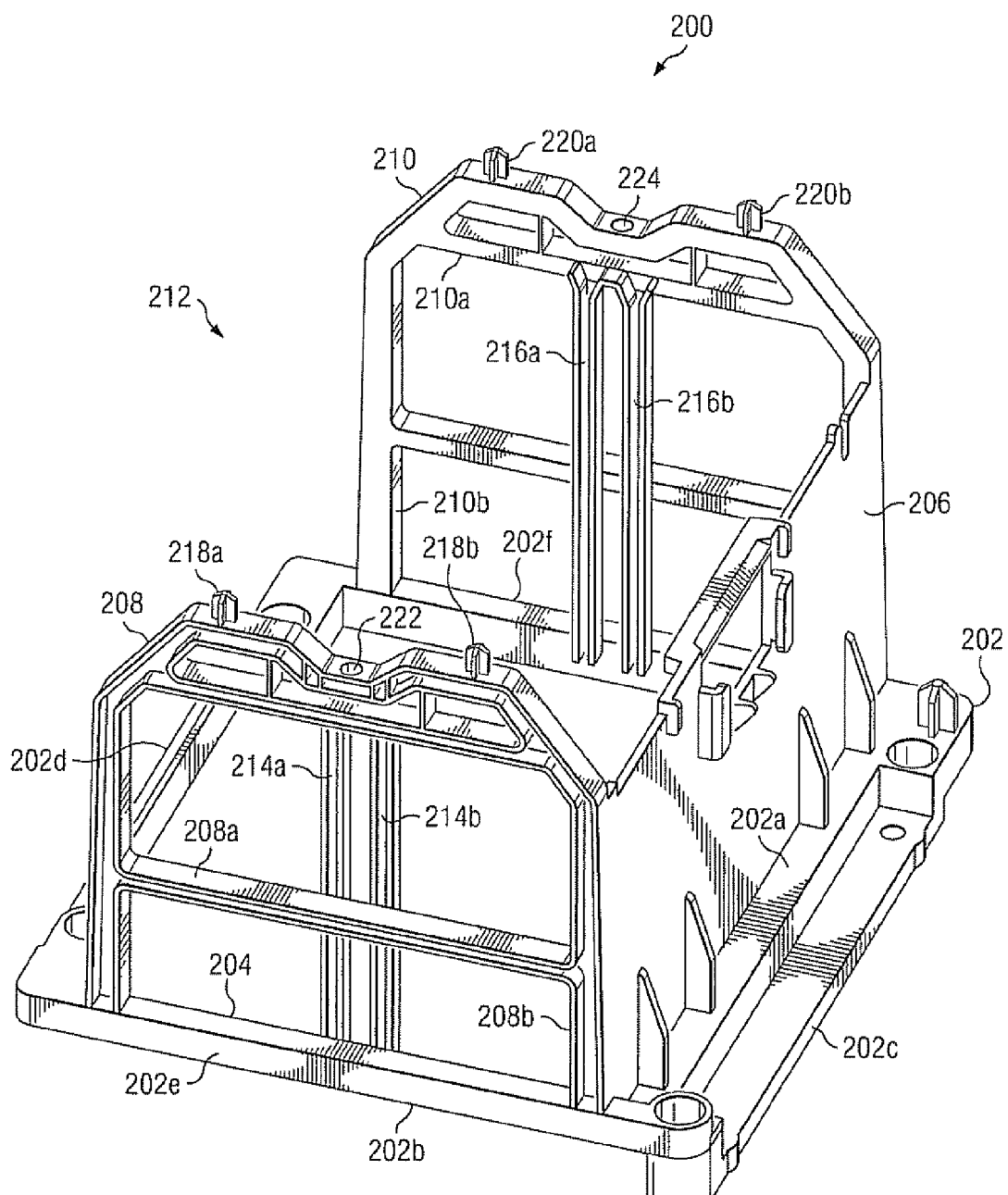
FIG. 2 is a perspective view illustrating an embodiment of a support frame.

Referring now to FIG. 2, a support frame 200 is illustrated. The support frame 200 includes a base 202 having a top surface 202a, a bottom surface 202b located opposite the top surface 202a, a front edge 202c extending between the top surface 202a and the bottom surface 202b, a rear edge 202d located opposite the front edge 202c and extending between the top surface 202a and the bottom surface 202b, and a pair of opposing side edges 202e and 202f extending between the top surface 202a, the bottom surface 202b, the front edge 202c, and the rear edge 202d. A riser aperture 204 is defined by and centrally located on the base 202 and extends through the base 202 from the top surface 202a to the bottom surface 202b. A front wall 206 extends from the top surface 202a of the base 202 between the riser aperture 204 defined by the base 202 and the front edge 202c of the base 202. A support frame member 208 extends between the top surface 202a of the base 202 and front wall 206, is located between the side edge 202e and the riser aperture 204, and defines a plurality of air passageways 208a and 208b. A support frame member 210 extends between the top surface 202a of the base 202 and front wall 206, is located between the side edge 202f and the riser aperture 204 from a location opposite the riser aperture 204 from the support frame member 208, and defines a plurality of air passageways 210a and 210b. A riser housing 212 is defined between the front wall 206 and the support frame members 208 and 210. A pair of riser guides 214a and 214b are substantially centrally located on the support frame member 208 in a parallel orientation to each other adjacent the riser housing 212. A pair of riser guides 216a and 216b are substantially centrally located on the support frame member 210 in a parallel orientation to each other adjacent the riser housing 212 and substantially in alignment with the riser guides 214a and 214b, respectively. A pair of retention member guide posts 218a and 218b extend from an end of the support frame member 208 opposite the base 202 and in a spaced apart orientation from each other. A pair of retention member guide posts 220a and 220b extend from an end of the support frame member 210 opposite the base 202 and in a spaced apart orientation from each other. A retention member coupling aperture 222 is defined by the support frame member 208 and located between the guide posts 218a and 218b. A retention member coupling aperture 224 is defined by the support frame member 210 and located between the guide posts 220a and 220b.

Figure 3A:
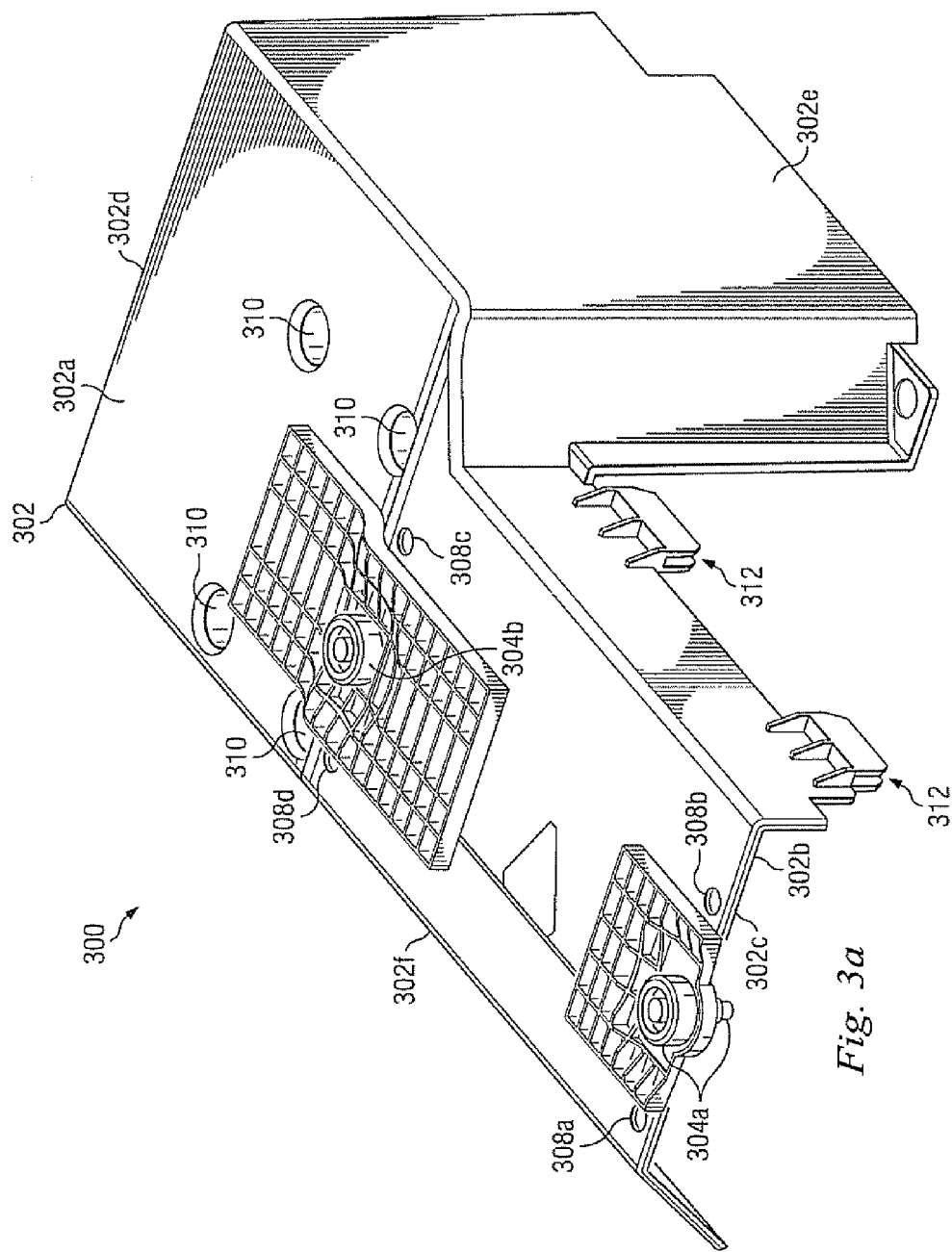
FIG. 3a is a top perspective view illustrating an embodiment of a riser retention member used with the support frame of FIG. 2.
Figure 3B:
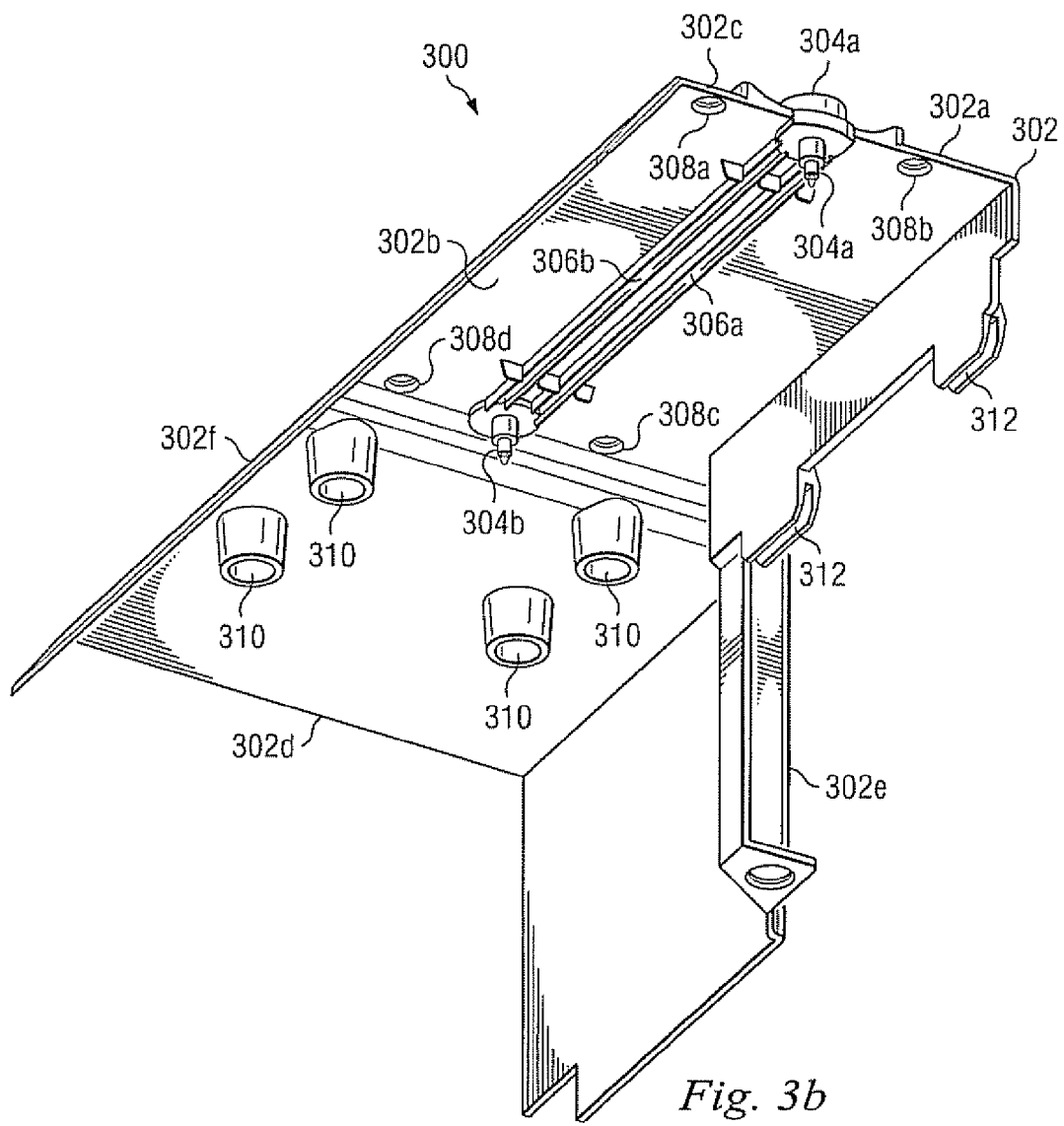

Referring now to FIGS. 3a and 3b, a riser retention member 300 is illustrated. The riser retention member 300 includes a base wall 302 having a top surface 302a, a bottom surface 302b located opposite the top surface 302a, a front edge 302c extending between the top surface 302a and the bottom surface 302b, and a rear edge 302d located opposite the front edge 302c and extending between the top surface 302a and the bottom surface 302b. A side wall 302e extends substantially perpendicularly from the base wall 302 and between the front edge 302c and the rear edge 302d. A side wall 302f extends from the base wall 302 at an obtuse angle from the bottom surface 302b of the base wall 302 between the front edge 302c and the rear edge 302d and opposite the base wall 302 from the side wall 302e. In an embodiment, the base wall 302, the side wall 302e, and the side wall 302f provide a shroud that is operable to direct airflow. A plurality of fasteners 304a and 304b are coupled to the base wall 302 and, in an embodiment, include thumb screws that include a grip member extending above the top surface 302a of the base wall 302 and a threaded fastener that extends below the bottom surface 302b of the base wall 302, as illustrated. A pair of substantially parallel riser channels 306a and 306b are defined by the base wall 302 and are located on the bottom surface 302b of the base wall 302 between the fasteners 304a and 304b. A plurality of guide apertures 308a, 308b, 308c and 308d are defined by the base wall 302, located in a spaced apart orientation from each other on either side of the riser channels 306a and 206b, and extend through the base wall 302 from the top surface 302a to the bottom surface 302b. A plurality of heat pipe apertures 310 are defined by the base wall 302 and located in a spaced apart orientation from each other. A pair of coupling channels 312 are defined by the side wall 302e and located on an edge of the side wall 302e opposite the base wall 302.

Figure 4:
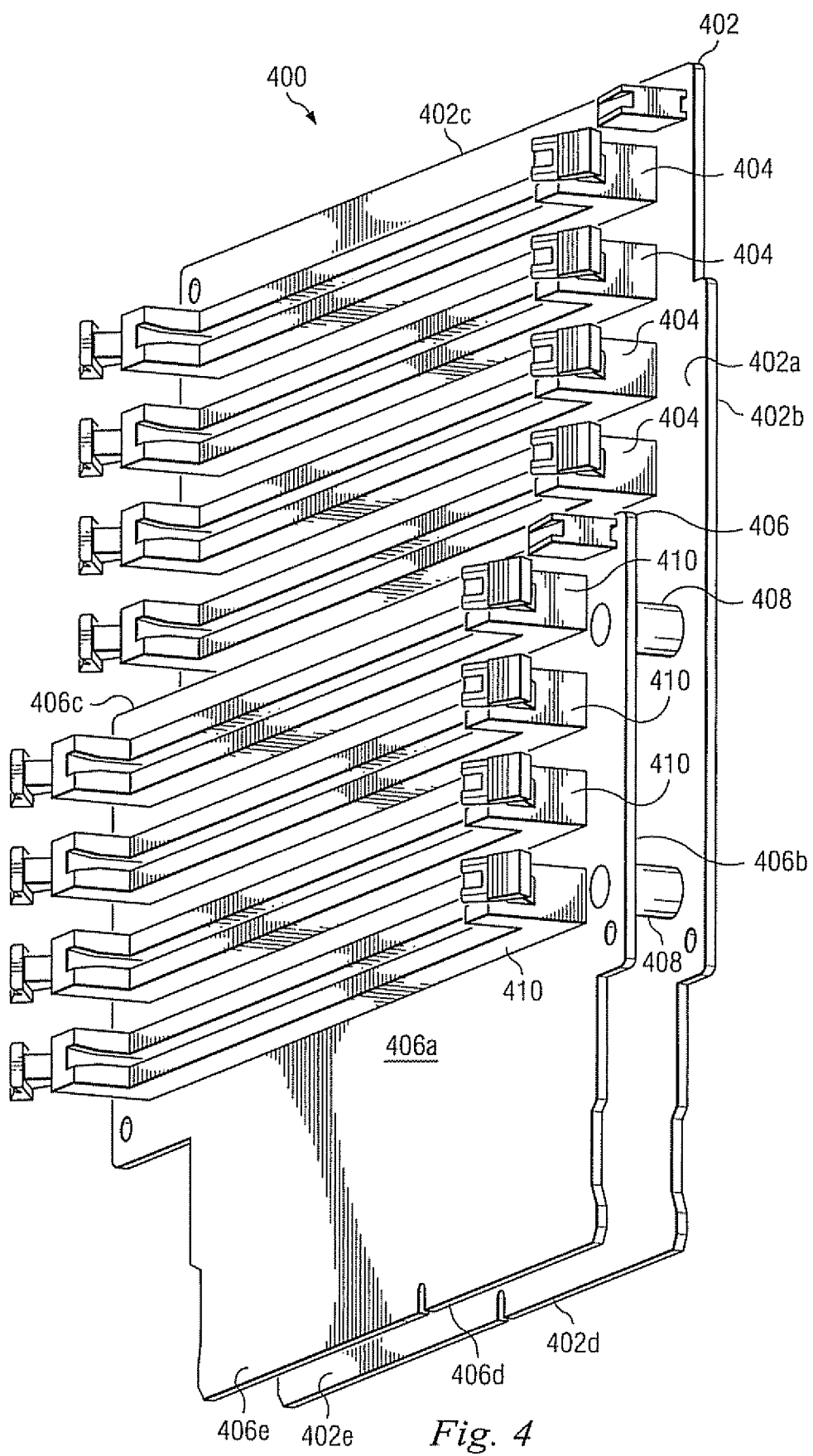
FIG. 4 is a perspective view illustrating an embodiment of a riser used with the support frame of FIG. 2 and the riser retention member of FIGS. 3a and 3b.

Referring now to FIG. 4, a riser 400 is illustrated. The riser 400 includes a base board 402 having a front surface 402a, a rear surface 402b located opposite the front surface 402a, a top edge 402c extending between the front surface 402a and the rear surface 402b, and a bottom edge 402d located opposite the top edge 402c and extending between the front surface 402a and the rear surface 402b. A riser connector 402e is located adjacent the bottom edge 402d of the base board 402. In an embodiment, the base board 402 is a circuit board. A plurality of secondary component connectors 404 extend from the front surface 402a of the base board 402 in a substantially parallel orientation to each other and adjacent the top edge 402c of the base board 402. In an embodiment, the secondary component connectors 404 are memory device connectors and are operable to electrically couple, for example, DIMMs, to the riser connector 402e. A secondary board 406 having a front surface 406a, a rear surface 406b located opposite the front surface 406a, a top edge 406c extending between the front surface 406a and the rear surface 406b, and a bottom edge 406d located opposite the top edge 406c and extending between the front surface 406a and the rear surface 406b, is coupled to the base board 402 by a plurality of beams 408 that extend between the front surface 402a of the base board 402 and the rear surface 406b of the secondary board 406 and hold the secondary board 406 substantially parallel to the base board 402. A riser connector 406e is located adjacent the bottom edge 406d of the secondary board 406. A plurality of secondary component connectors 410 extend from the front surface 406a of the secondary board 406 in a substantially parallel orientation to each other and adjacent the top edge 406c of the secondary board 406. In an embodiment, the secondary component connectors 410 are memory device connectors and are operable to electrically couple, for example, DIMMs, to the riser connector 406e.

Figure 5:
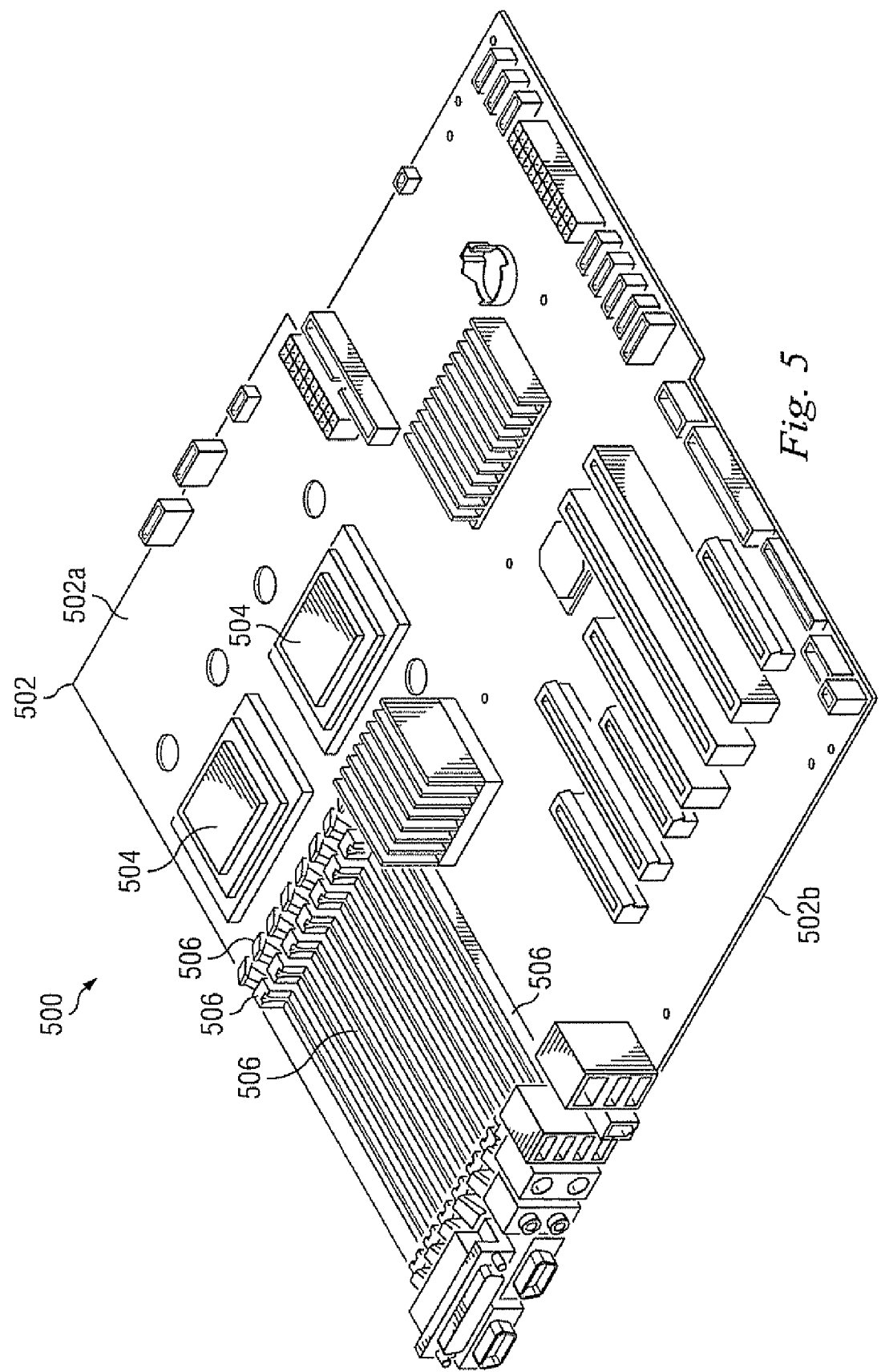
FIG. 5 is a perspective view illustrating an embodiment of a board used with the support frame of FIG. 2, the riser retention member of FIGS. 3a and 3b, and the riser of FIG. 4.

Referring now to FIG. 5, a board 500 is illustrated. In an embodiment, the board 500 is a Server System Infrastructure (SSI) form factor board. The board 500 includes a base 502 having a top surface 502a and a bottom surface 502b located opposite the top surface 502a. The board 500 may be housed in a chassis such as, for example, the chassis 116, described above with reference to FIG. 1, and may includes some or all of the components of an IHS such as, for example, the IHS 100, described above with reference to FIG. 1. For example, a plurality of processors 504, which may be the processor 102, described above with reference to FIG. 1, may be mounted to the top surface 502a of the base 502. A plurality of primary component connectors 506 are mounted to the top surface 502a of the base 502 and located adjacent the processors 504. In an embodiment, the primary component connectors 506 include eight memory device connectors that are operable to couple eight memory devices such as, for example, DIMMs to the board and electrically coupled those memory devices to the processors 504.

Figure 6:
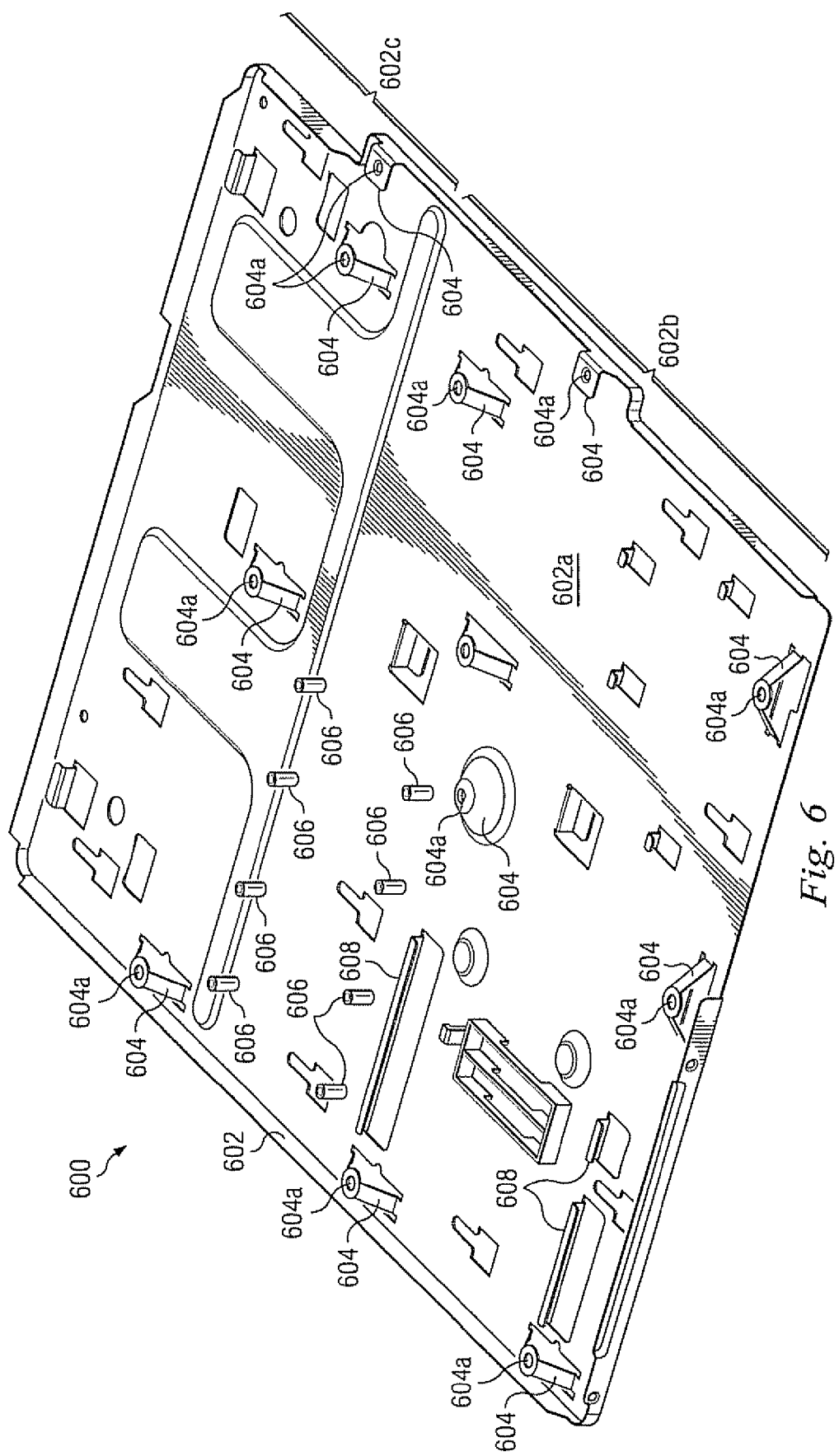
FIG. 6 is a perspective view illustrating an embodiment of a board reinforcing member used with the support frame of FIG. 2, the riser retention member of FIGS. 3a and 3b, the riser of FIG. 4, and the board of FIG. 5.

Referring now to FIG. 6, a board reinforcing member 600 is illustrated. The board reinforcing member 600 includes a base 602 having a top surface 602a and having a board coupling section 602b and a component coupling section 602c. A plurality of coupling features 604 each defining a coupling aperture 604a extend from the top surface 602a of the base 602. A plurality of heat sink coupling members 606 extend from the top surface 602a of the base 602. A plurality of board reinforcing beams 608 extend from the top surface 602a of the base 602 in a substantially parallel and spaced apart orientation from each other.

Figure 7B:
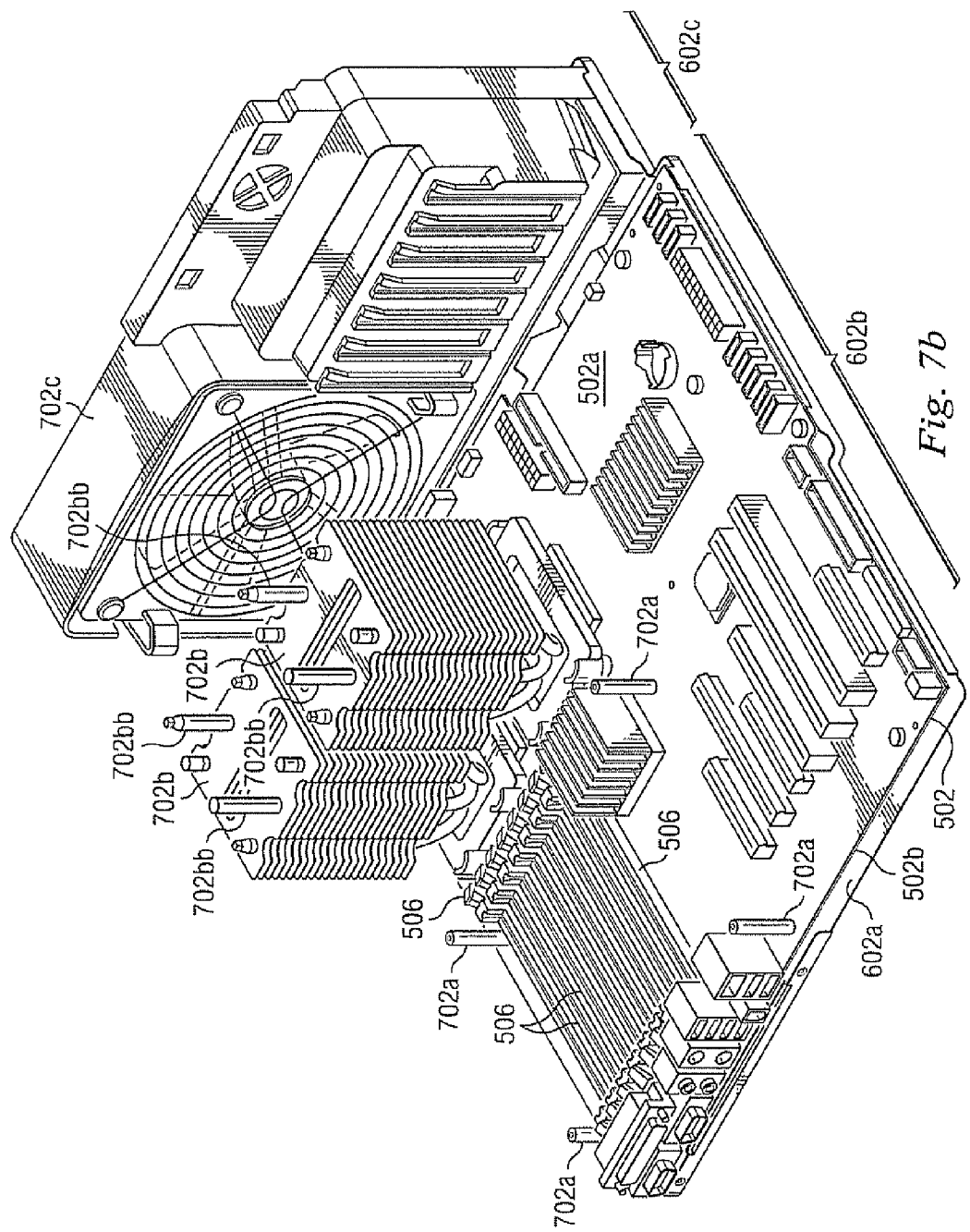
FIG. 7b is a perspective view illustrating an embodiment of the board of FIG. 5 coupled to the board reinforcing member of FIG. 6.

Referring now to FIGS. 2, 5, 6, 7a, 7b, 7c and 7d, a method 700 for retaining a riser in an IHS is illustrated. The method 700 begins at step 702 where a board including primary component connectors and a support frame is provided. The board 500, illustrated in FIG. 5, is first coupled to the board reinforcing member 600, illustrated in FIG. 6, by positioning the bottom surface 502b of the board 500 adjacent the top surface 602a of the board reinforcing member 600 and in the board coupling section 602b on the board reinforcing member 600 such that the primary component connectors 506 on the board 500 are adjacent the board reinforcing beams 608 on the board reinforcing member 600 and the processors 504 on the board 500 are adjacent the plurality of heat sink coupling members 606. The board 500 may then be coupled to the board reinforcing member 600 by, for example, engaging threaded fasteners with the board 500 and the coupling apertures 604a defined by the coupling features 604 on the board reinforcing member 600, as illustrated in FIG. 7b. A plurality of support frame couplers 702a may be coupled to the board 500 such that they extend from the top surface 502a of the board 500 in a spaced apart orientation from each other and adjacent the primary component connectors 506, as illustrated in FIG. 7b. A pair of heat sinks 702b each including a plurality of heat pipes 702bb extending from the heat sink 702b may be coupled to the processors 504 by, for example, engaging a threaded fasteners with the heat sinks 702b and the heat sink coupling members 606 that extend from the board reinforcing member 606 and through the board 500, as illustrated in FIG. 7b. A fan module 702c is coupled to the board reinforcing member 600 in the component coupling section 602c adjacent the board 500.

Figure 7C:
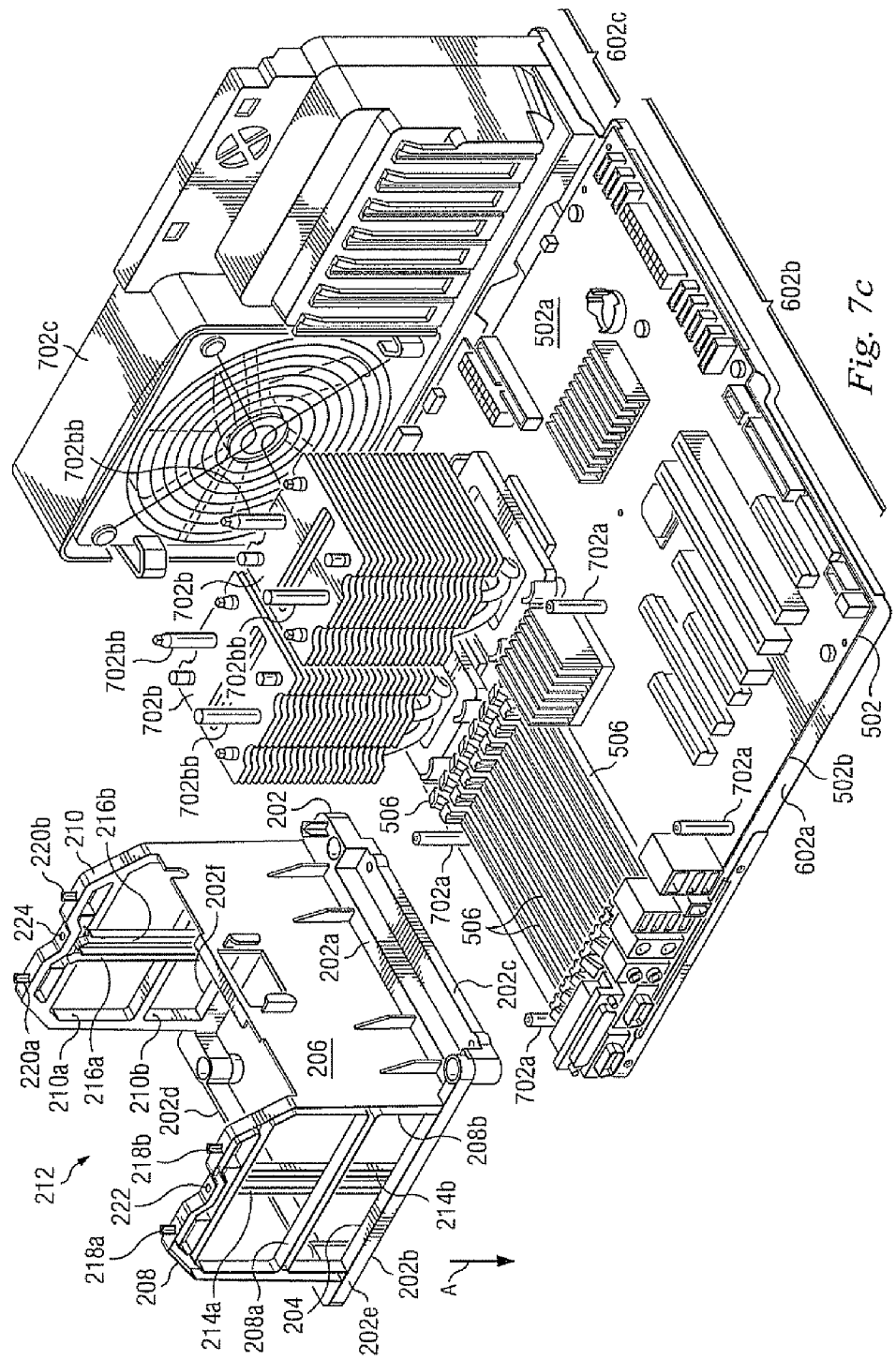
FIG. 7c is a perspective view illustrating an embodiment of the support frame of FIG. 2 being coupled to the board and board reinforcing member of FIG. 7b.
Figure 7D:
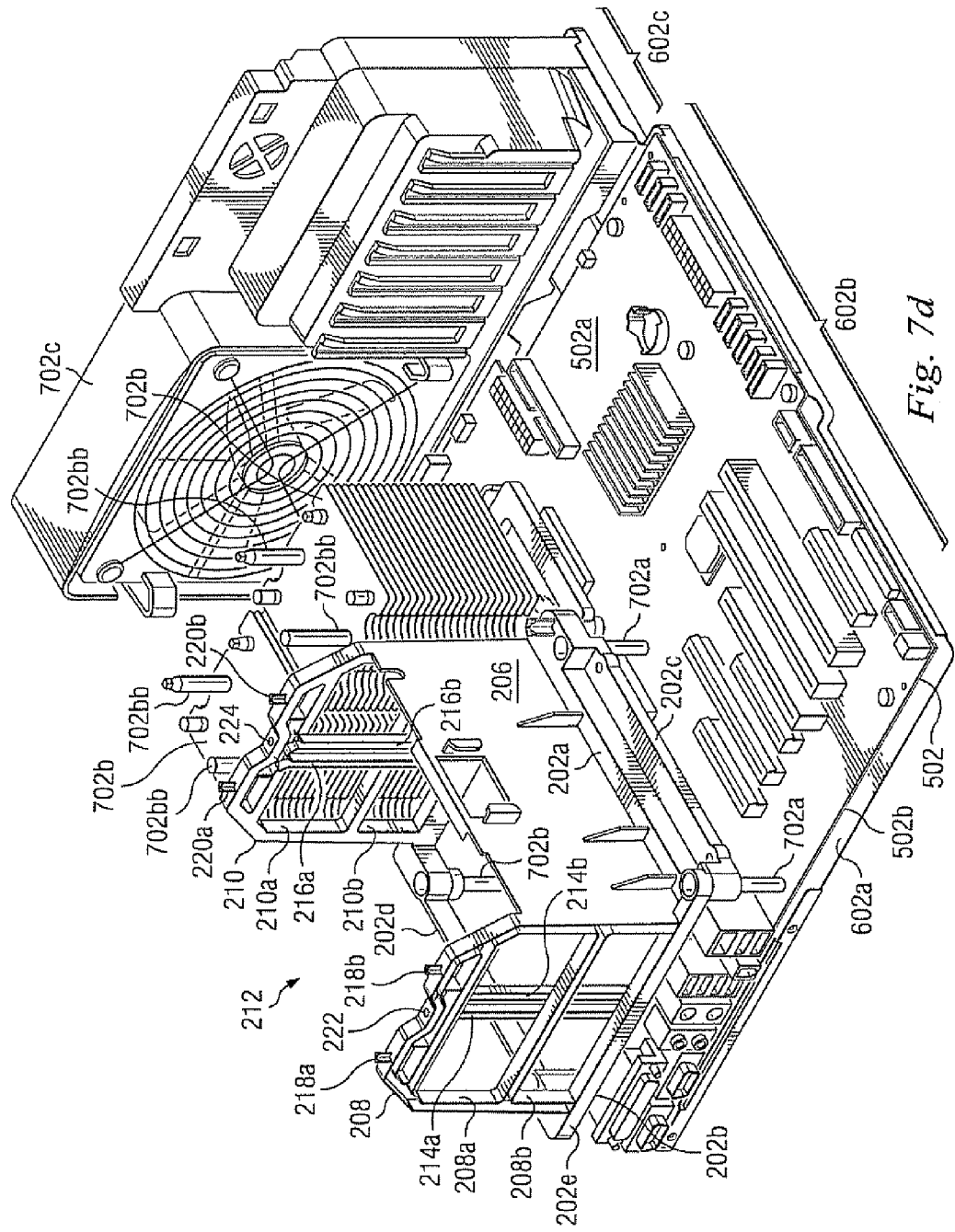
FIG. 7d is a perspective view illustrating an embodiment of the support frame of FIG. 2 coupled to the board and board reinforcing member of FIG. 7b.

The support frame 200, illustrated in FIG. 2, is then positioned adjacent the board 500 such that the bottom surface 202b of the support frame 200 is located adjacent the top surface 502a of the board 500 and the side edge 202f of the support frame 200 is located adjacent the heat sinks 702b, as illustrated in FIG. 7c. The support frame 200 is then moved in a direction A such that support frame couplers 702a engage the support frame 200 and the support frame 200 is positioned on the board 500 such that the support frame member 210 is located adjacent the heat sinks 702b and the primary component connectors 506 are located adjacent the riser aperture 204 defined by the support frame 200, as illustrated in FIG. 7d. The support frame 200 may then be coupled to the board 500 by, for example, engaging the support frame 200 and the support frame couplers 702a with threaded fasteners.

Figure 7E:
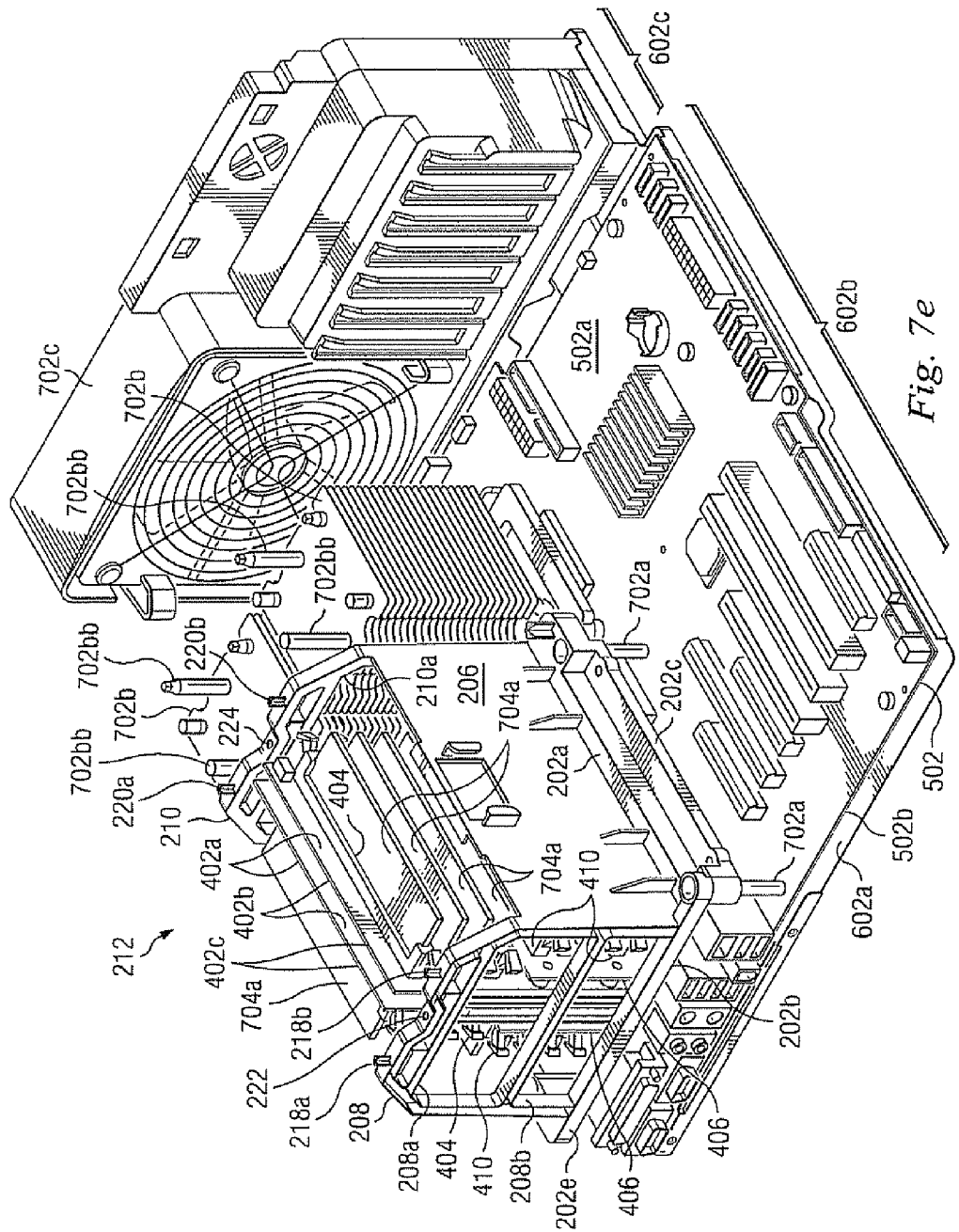
FIG. 7e is a front perspective view illustrating an embodiment of a plurality of the risers of FIG. 4 coupled to the support frame, board, and board reinforcing member of FIG. 7d.
Figure 7F:
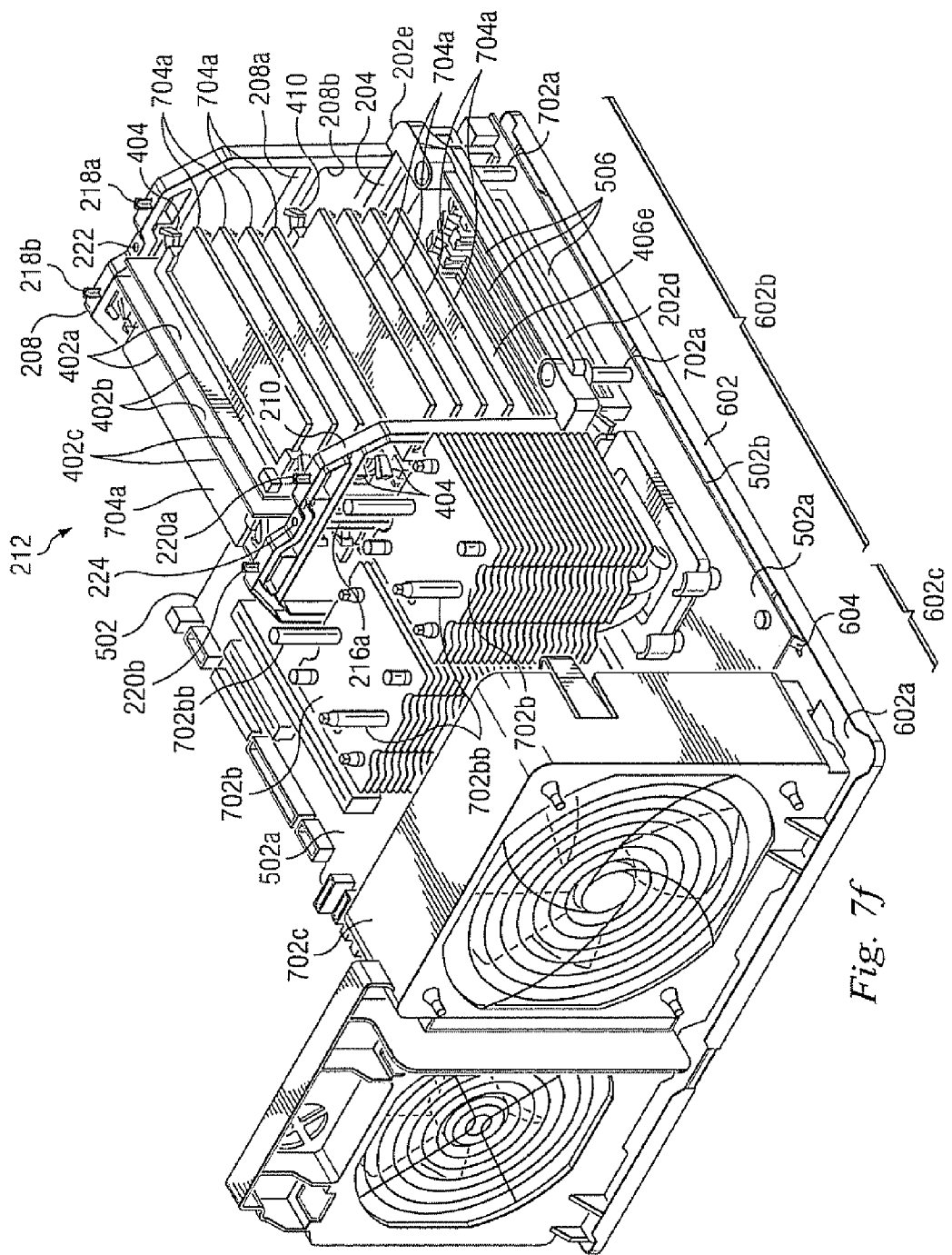
FIG. 7f is a rear perspective view illustrating an embodiment of a plurality of the risers of FIG. 4 coupled to the support frame, board, and board reinforcing member of FIG. 7d.

Referring now to FIGS. 2, 4, 5, 7a, 7d, 7e and 7f, the method 700 proceeds to step 704 where a riser including secondary component connectors and components is provided. A plurality of the risers 400, illustrated in FIG. 4, are provided. A plurality of components 704a which may be, for example, memory devices such as, for example, DIMMs, are coupled to the secondary component connectors 404 and 410 on the risers 400. The method 700 then proceeds to step 706 where the risers are guided towards the primary component connectors with the support frame. A riser 400 including the components 704a may be positioned in the riser housing 212 defined by the support frame 200 such that opposing edges on the base board 402 of the riser 400 engage the riser guides 214a and 216a, respectively, on the support frame 200 and the secondary board 406 is located opposite the base board 402 from the riser guides 214b and 216b. The riser 400 is then moved towards the primary component connectors 506 and guided by the riser guides 214a and 216a such that the riser connector 402e on the base board 402 and the riser connector 406e on the secondary board 406 engage two adjacent primary component connectors 506. A riser 400 with the components 704a may be coupled to the primary component connectors 506 using the riser guides 214b and 216b in substantially the same manner as described above for the riser guides 214a and 216a, such that the two risers 400 with the components 704a are coupled to the primary component connectors 506 and located in the riser housing 212 defined by the support frame 200, as illustrated in FIGS. 7e and 7f. In an embodiment, the two risers 400 allow the coupling of sixteen components 704a to the board 500 that has eight primary component connectors 506.

Figure 7G:
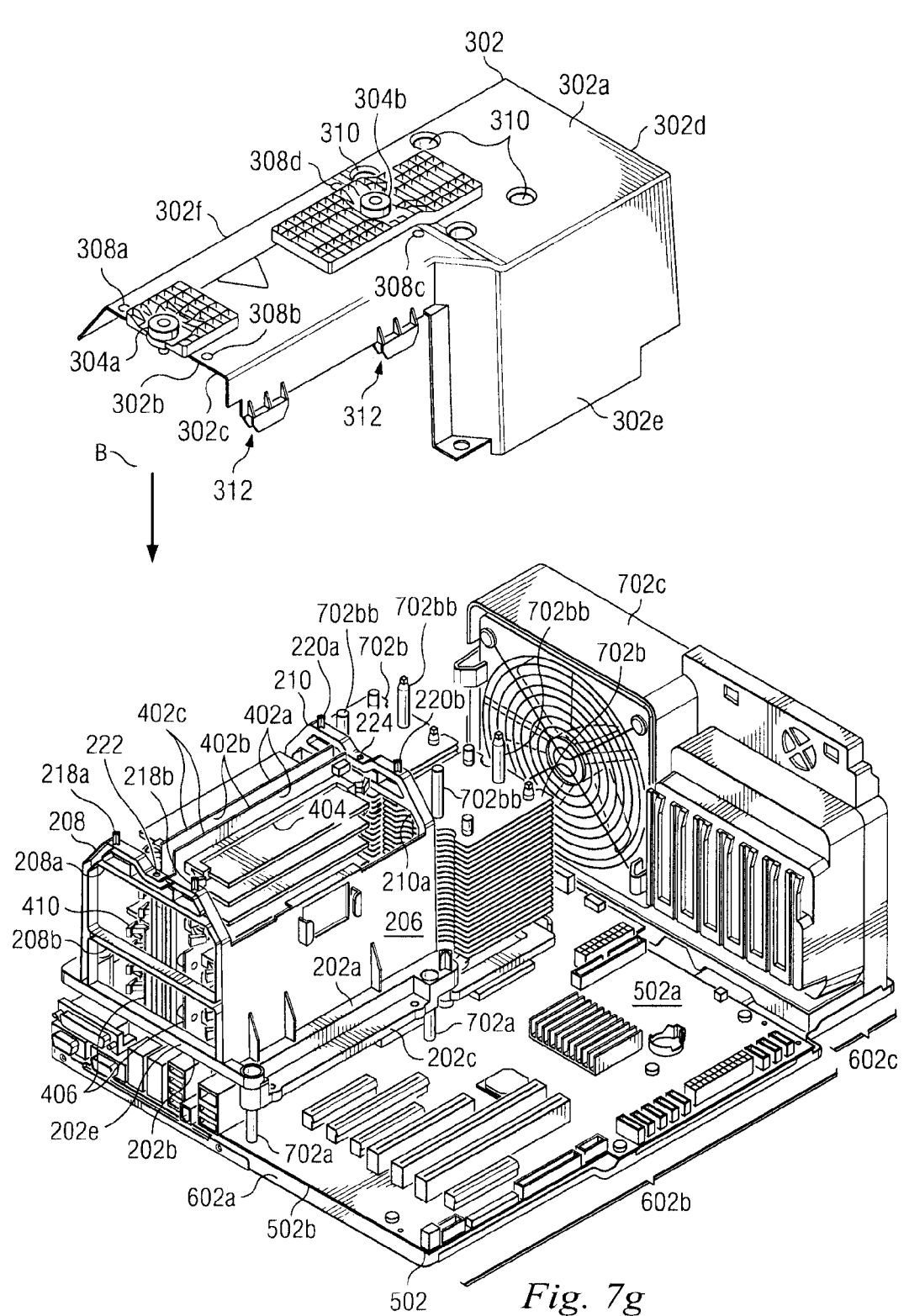
FIG. 7g is a perspective view illustrating an embodiment of the riser retention member of FIGS. 3a and 3b being coupled to the support frame, board, and board reinforcing member of FIGS. 7e and 7f.
Figure 7H:
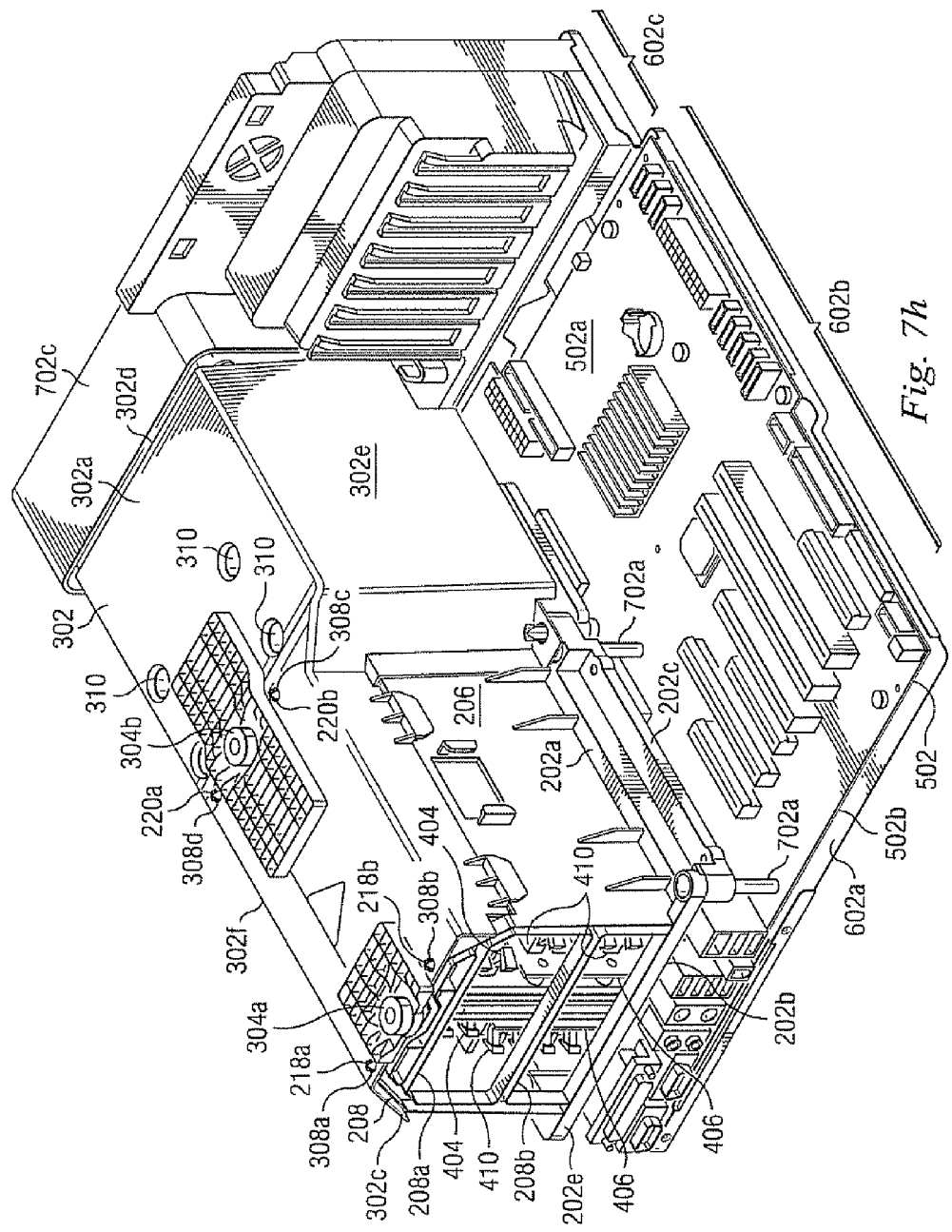
FIG. 7h is a front perspective view illustrating an embodiment of the riser retention member of FIGS. 3a and 3b coupled to the support frame, board, and board reinforcing member of FIGS. 7e and 7f.
Figure 7I:
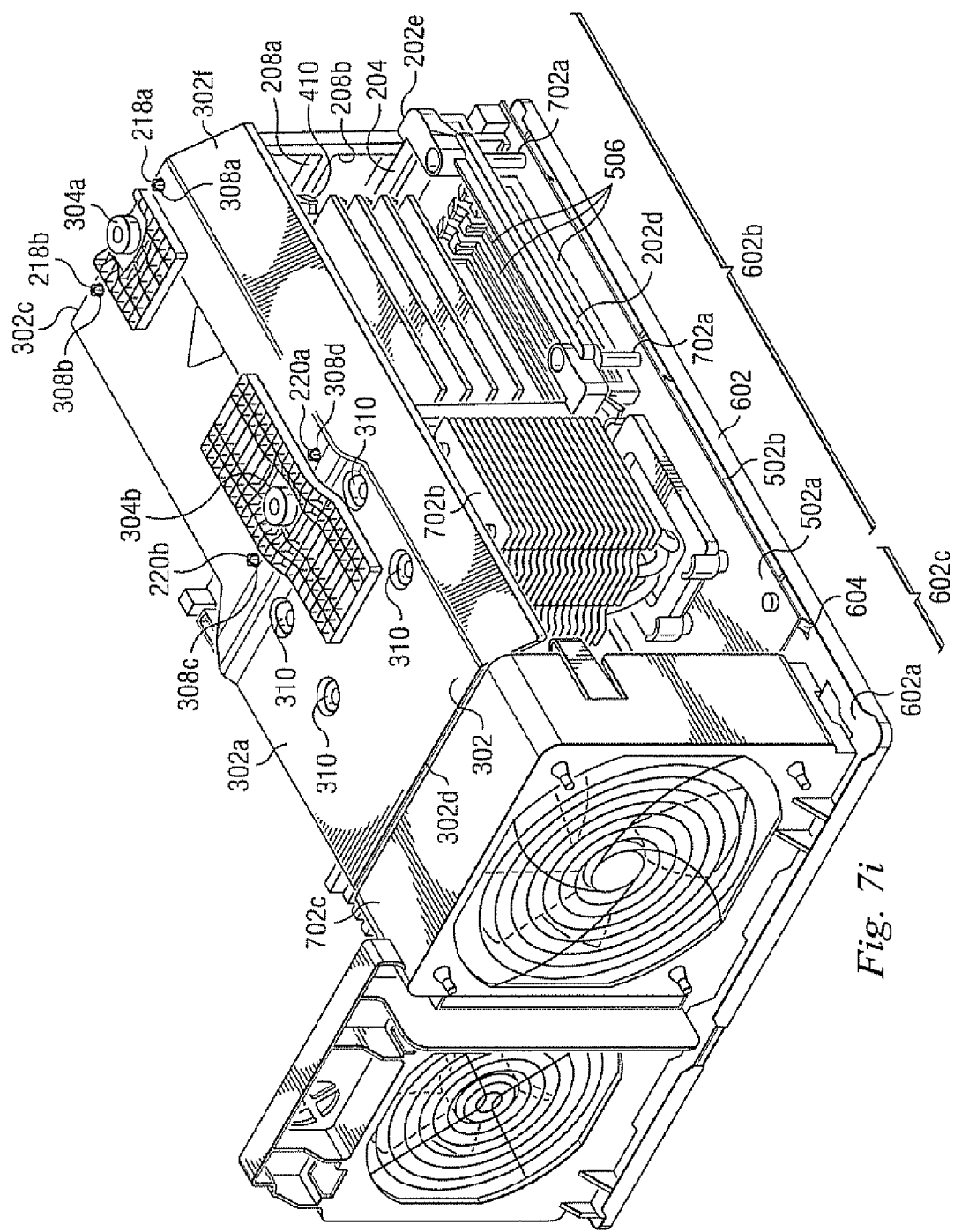
FIG. 7i is a rear perspective view illustrating an embodiment of the riser retention member of FIGS. 3a and 3b coupled to the support frame, board, and board reinforcing member of FIGS. 7e and 7f.

Referring now to FIGS. 2, 3a, 3b, 4, 5, 7a, 7e, 7f, 7g, 7h and 7i the method 700 proceeds to step 708 where the risers are retained and supported by engaging the risers with a riser retention member. The riser retention member 300, illustrated in FIGS. 3a and 3b, is positioned adjacent the support frame 200 on the board 500 such that the bottom surface 302b of the base wall 302 is located adjacent the risers 400 and the heat sinks 702a with the side wall 302e on the riser retention member 300 adjacent the front wall 206 on the support frame 200, the guide apertures 308a, 308b, 308c and 308d aligned with the guide posts 218a, 218b, 220b and 220a, respectively, the heat pipe apertures 310 aligned with the heat pipes 702bb, the fasteners 304a and 304b aligned with the retention member coupling apertures 222 and 224, respectively, and the top edges 402c of the risers 400 aligned with the riser channels 306a and 306b defined by the riser retention member 300, as illustrated in FIG. 7g. The riser retention member 300 is then moved in a direction B such that the front wall 206 on the support frame 200 becomes positioned in the coupling channels 312 defined by the side wall 302e of the riser retention member 300, the guide posts 218a, 218b, 220b and 220a become positioned in the guide apertures 308a, 308b, 308c and 308d, respectively, defined by the riser retention member 300, the heat pipes 702bb become positioned in the heat pipe apertures 310 defined by the riser retention member 300, and the top edges 402c of the risers 400 engage the riser channels 306a and 306b defined by the riser retention member 300, as illustrated in FIGS. 7h and 7i. The riser retention member 300 is then coupled to the support frame 200 by engaging the fasteners 340a and 304b with the retention member coupling apertures 222 and 224, respectively, defined by the support frame 200 such that the base wall 302 of the riser retention member 300 exerts a retaining force on the top edge 402c of the risers 400 and ensures the engagement of the riser connectors 402e and 406e on the risers 400 with the primary component connectors 506 on the board 500 and the electrical coupling of the components 704a on the risers 400 with the board 500 and the processors 504. The board reinforcing member 600 and the board reinforcing beams 408 help to support the board 500 and minimize deflection of the board 500 when the retaining force is provided by the riser retention member 300. The method 700 then proceeds to step 710 where the components are cooled. The fans module 702c is operated to create an airflow that is directed by the shroud defined by the base wall 302 and the sides walls 302e and 302f on the riser retention member 300 and through the air passageways 210a and 210b defined by the support frame 200 and over the components 704a coupled to the risers 400 in order to cool the components 704a. Thus, a method and apparatus are provided which allow a plurality of risers including a plurality of components to be coupled to, retained, and supported on a board and allow the components to be cooled.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A riser retention apparatus, comprising:
   a board;
   a component connector mounted to the board;
   a support frame coupled to the board adjacent the component connector and extending from the board;
   a riser guide located on the support frame and operable as a means to engage a riser and guide a riser connector on the riser toward the component connector; and
   a riser retention member operable to couple to the support frame to provide a retaining force to the riser in order to retain the riser connector in engagement with the component connector.

2. The apparatus of claim 1, wherein the component connector is a Dual Inline Memory Module (DIMM) connector.

3. The apparatus of claim 1, wherein the support frame defines an air passageway for allowing air to pass through the support frame to the riser coupled to the component connector.

4. The apparatus of claim 1, wherein a plurality of the riser guides are located on the support frame, whereby at least one riser guide is located adjacent each opposing end of the component connector.

5. The apparatus of claim 1, wherein the riser retention member comprises a shroud that is operable to direct air toward the component connector.

6. The apparatus of claim 1, wherein the riser retention member comprises a riser channel that is operable as a means to engage the riser when the riser retention member is coupled to the support frame.

7. The apparatus of claim 1, further comprising:
   a board reinforcing member coupled to the board adjacent the support frame.

8. An information handling system, comprising:
   an information handling system chassis;
   a board located in the information handling system chassis;
   a processor coupled to the board;
   a primary component connector mounted to the board and electrically coupled to the processor;
   a support frame coupled to the board adjacent the primary component connector and extending from the board;
   a riser guide located on the support frame;
   a riser comprising a plurality of secondary component connectors and a riser connector, whereby the riser engages the riser guide; and
   a riser retention member coupled to the support frame and providing a retaining force to the riser in order to retain the riser connector in engagement with the primary component connector.

9. The system of claim 8, wherein the primary component connector and the plurality of secondary component connectors are Dual Inline Memory Module (DIMM) connectors.

10. The system of claim 9, wherein the support frame defines an air passageway for allowing air to pass through the support frame to the riser.

11. The system of claim 9, wherein a plurality of the riser guides are located on the support frame, whereby at least one riser guide is located adjacent each opposing end of the primary component connector.

12. The system of claim 9, further comprising:
    a fan coupled to the board adjacent the support frame.

13. The system of claim 12, wherein the riser retention member comprises a shroud that is operable to direct air from the fan toward the riser.

14. The system of claim 9, wherein the riser retention member comprises a riser channel that engages the riser.

15. The system of claim 9, further comprising:
    a board reinforcing member coupled to the board adjacent the support frame.

16. The system of claim 9, further comprising:
a plurality of components coupled to respective secondary component connectors and electrically coupled to the processor through the primary component connector.

17. The system of claim 16, wherein the plurality of components are Dual Inline Memory Modules (DIMMs).

18. A method for retaining a riser in an information handling system, comprising:
providing a board comprising a primary component connector and a support frame located adjacent the primary component connector;
providing a riser comprising a plurality of secondary component connectors and at least two components coupled to respective secondary component connectors;
guiding a riser connector on the riser toward the primary component connector with the support frame; and
retaining the riser connector in the primary component connector by engaging the riser to provide a retaining force with a riser retention member that is coupled to the support frame.

19. The method of claim 18, further comprising:
cooling the at least two components by directing air with the riser retention member through air passageways defined by the support frame and towards the at least two components.

20. The method of claim 18, further comprising:
supporting the board with a board reinforcing member that is coupled to the board when the riser retention member provides the retaining force.

* * * * *